Figures 1, 2:
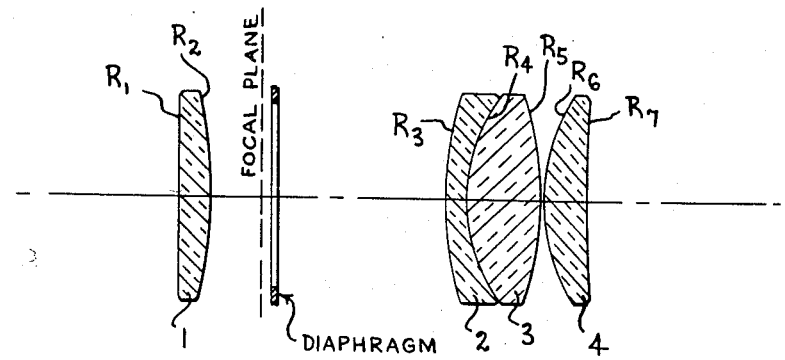

June 10, 1958       R. M. MULLER       2,837,969
TELESCOPE AND MICROSCOPE EYEPIECE SYSTEM
Filed Oct. 15, 1956

| LENS | N | V | RADII | THICKNESSES |
|---|---|---|---|---|
| 1 | 1.523 | 58.6 | $R_1 = \infty$ <br> $R_2 = +1.6977 F$ | $t_1 = .1208 F$ <br> $S_1 = .9376 F$ |
| 2 | 1.750 | 27.7 | $R_3 = +1.7932 F$ <br> $R_4 = +.6644 F$ | $t_2 = .0864 F$ |
| 3 | 1.517 | 64.5 | $R_5 = -1.2568 F$ | $t_3 = .2936 F$ <br> $S_2 = .0108 F$ |
| 4 | 1.517 | 64.5 | $R_6 = +.7536 F$ <br> $R_7 = +7.9824 F$ | $t_4 = .1728 F$ |

INVENTOR
ROBERT M. MULLER
BY
Herbert C. Kimball
ATTORNEY

United States Patent Office 2,837,969
Patented June 10, 1958

2,837,969

TELESCOPE AND MICROSCOPE EYEPIECE SYSTEM

Robert M. Muller, Cheektowaga, N. Y., assignor to American Optical Company, Southbridge, Mass., a voluntary association of Massachusetts Application October 15, 1956, Serial No. 615,795

5 Claims. (Cl. 88—57)

This invention relates to a telescopic eyepiece having a wide flat field and adequately corrected for color. An advantage of this eyepiece is that it has a high eye point.

An object of my invention is to obtain a wide field eyepiece for use in microscopes, the field being well corrected for color and for other aberrations, and which allows full illumination of the field where the pupil of the system is positioned within 100 millimeters of its focal plane.

A preferred example of telescope eyepiece according to my invention is shown in the accompanying drawing in which:

Fig. 1 shows a preferred form of the invention, and
Fig. 2 gives constructional data for the optical system of Fig. 1.

In a microscope there are restrictions on the eyepiece which may be used, these restrictions being inherent in the microscope design. Due to the confined space in a microscope tube, the pupil of the eyepiece cannot be at any substantial distance from its focal plane. Moreover the diameter of the tube is small enough so as to tend to cause the eyepiece to have a vignetting effect, especially with the gun-sight type of lens system shown in Fig. 1. To accommodate this type of lens system to use in a microscope I have incorporated in the system a field lens, thereby widening the field of the eyepiece. I prefer that the focal length of this field lens lie between 2.5 times and 8 times the equivalent focal length of the eyepiece. The field aberrations are maintained at a highly desirable level by controlling the ratio of the radii of curvature of the external surfaces of the doublet of the system, this ratio being identified in this description as the shape factor and lying between 1.24 and 1.66.

The preferred form of my invention shown in Fig. 1 illustrates the use of a field lens 1 in the system to overcome the vignetting effect which this gun-sight type of lens system would otherwise bring about so as to injuriously limit the field which can be observed in using the microscope. Fig. 1 also shows the diaphragm used in the microscope, and the field lens 1 is located in front of this diaphragm with the result that the field which may be observed by the eyepiece is widened.

The eyepiece includes in addition to the field lens 1 of crown glass, an intermediate component in the form of a doublet made up of a divergent lens element 2 and a convergent lens element 3, and a back component which is a convergent single lens 4 of crown glass. As above mentioned, the shape factor of the doublet should be such that the ratio of the radius $R_3$ to radius $R_5$, the external surfaces of the doublet, will be between 1.24 and 1.66, thereby maintaining the field aberrations at a desirable level.

The color correction is considerably improved by controlling the ratio of the V value of the glass of the first lens of the doublet to the V value of the glass of the second lens of the doublet so as to lie between .415 and .445. It is also important for color correction that the radius of curvature of the internal contact surfaces of the doublet lie between .65 and .71 times the equivalent focal length of the eyepiece. To still further improve the color correction I prefer that the radius of curvature of the rear surface of the second lens of the doublet lie between 1.17 and 1.34 times the equivalent focal length of the system.

If the focal length F of the system as a whole is taken as unity, the focal length of the field lens 1 in the preferred embodiment is 3.25 F. The V value of the element 2 in this embodiment is 27.7 and the V value of the element 3 is 64.5, with the ratio of the two being .429.

Figure 2 gives constructional data for the preferred form of my improved eyepiece, and this table of data is repeated below:

[F which is the focal length of the eyepiece equals unity]

| Lens | N | V | Radii | Thicknesses |
|---|---|---|---|---|
| 1 | 1.523 | 58.6 | $R_1 = \infty$<br>$R_2 = -1.6977$ F | $t_1 = .1208$ F<br>$S_1 = .9376$ F |
| 2 | 1.75 | 27.7 | $R_3 = +1.7932$ F<br>$R_4 = +.6644$ F | $t_2 = .0864$ F |
| 3 | 1.517 | 64.5 | $R_5 = -1.2568$ F | $t_3 = .2936$ F<br>$S_3 = .0108$ F |
| 4 | 1.517 | 64.5 | $R_6 = +.7536$ F<br>$R_7 = +7.9824$ F | $t_4 = .1728$ F |

In this table the lens elements are numbered from front to rear in the first column, the corresponding refractive indices N for the D line of the spectrum and the dispersive index V are given in the second and third columns. In the fourth column the radii of curvatures R are given, and in the last column are given the thicknesses $t$ of lenses and the spaces S between elements.

In this example the focal length of the field lens is 3.25 F, the shape factor is 1.43 and the ratio of the V values of the two glasses of the doublet is .429. The radius of curvature of the internal contact surfaces of the doublet is .66 F and the radius of curvature of the rear surface of the second lens of the doublet is 1.257 F, where F is the focal length of the whole eyepiece system.

By adding as a part of the eyepiece system a field lens which is located in front of the diaphragm, I have decreased the vignetting effect, thereby enabling the observer to see in the field of the microscope marginal areas which otherwise could be observed only by changing the setting of the stage or by other adjustment.

It has been found that the eyepiece offers desirable features in use due to flatness of field and adequate correction for color. In microscope use the eyepiece avoids vignetting which otherwise might occur with a lens system of this gun-sight type. Moreover the exit pupil affords adequate eye relief.

I claim:

1. In combination with the diaphragm of a microscope, an eyepiece system having a relatively wide flat field and adequately corrected for color and composed of three components, the intermediate component being a convergent doublet having the radius of curvature of the internal contact surfaces lying between .65 F and .71 F where F is the focal length of the system, and the ratio of the V values of the two glasses of the doublet lying between .415 and .445, the back component being a convergent single lens of crown glass and the front component being a convergent field lens of crown glass having a focal length lying between 2.5 F and 8 F, the front component being in front of said diaphragm and the other two components being in back of said diaphragm.

2. The combination as claimed in claim 1 in which the radius of curvature of the rear surface of the rear lens of the doublet lies between 1.17 F and 1.34 F.

3. The combination as claimed in claim 1 in which the ratio of the radius of curvature of the front surface of the front lens of the doublet to the radius of curvature of the rear surface of the rear lens of the doublet lies between 1.24 and 1.66.

4. The combination as claimed in claim 1 in which the radius of curvature of the rear surface of the rear lens of the doublet lies between 1.17 F and 1.34 F and the ratio of the radius of curvature of the front surface of the front lens of the doublet to the radius of curvature of said rear surace of the rear lens lies between 1.24 and 1.66.

5. A telescopic eyepiece system having a relatively wide flat field and adequately corrected for color and composed of three components, the intermediate component being a doublet with a divergent lens of relatively high index glass, in which the refractive indices N and dispersive indices V of the lenses, the radii of curvature R of the optical surfaces, the thicknesses $t$ of the lenses and the spaces S between lens elements are substantially as listed in order from front to rear under the respective headings in the following table:

| Lens | N | V | Radii | Thicknesses |
|---|---|---|---|---|
| 1 | 1.523 | 58.6 | $R_1=\infty$<br>$R_2=-1.6977\ F$ | $t_1=.1208\ F$ |
| 2 | 1.75 | 27.7 | $R_3=+1.7932\ F$<br>$R_4=+.6644\ F$ | $S_1=.9376\ F$<br>$t_2=.0864\ F$ |
| 3 | 1.517 | 64.5 | $R_5=-1.2568\ F$ | $t_3=.2936\ F$<br>$S_2=.0108\ F$ |
| 4 | 1.517 | 64.5 | $R_6=+.7536\ F$<br>$R_7=+7.9824\ F$ | $t_4=.1728\ F$ | where F is the focal length of the eyepiece system and the + and − values of the radii R indicate surfaces respectively convex and concave to the front.

References Cited in the file of this patent

UNITED STATES PATENTS

| | | |
|---|---|---|
| 873,870 | Konig | Dec. 17, 1907 |
| 1,159,233 | Konig | Nov. 2, 1915 |
| 1,699,682 | Bertele | Jan. 22, 1929 |

FOREIGN PATENTS

| | | |
|---|---|---|
| 270,274 | Germany | Feb. 11, 1914 |
| 303,258 | Germany | Sept. 15, 1919 |
| 35,375 | France | Aug. 6, 1929 |
| | (First addition to 629,556) | |